Patented Oct. 22, 1940

2,218,939

UNITED STATES PATENT OFFICE 2,218,939

URETHANE-LIKE COMPOUNDS

Adolf Steindorff and Gerhard Balle, Frankfort-on-the-Main, Karl Horst, Hofheim in Taunus, and Johann Rosenbach, Wiesbaden, Germany, assignors, by mesne assignments, to General Aniline & Film Corporation, New York, N. Y., a corporation of Delaware No Drawing. Application June 3, 1937, Serial No. 146,196. In Germany June 4, 1936

4 Claims. (Cl. 260—482)

The present invention relates to urethane-like compounds and to a process of preparing them.

We have found that urethane-like compounds are obtainable by condensing chlorocarbonic acid esters of phenols or nuclear hydrogenation products thereof which contain in the nucleus at least one hydrocarbon radical or acyl radical with at least 4 carbon atoms, with compounds carrying primary or secondary amino groups. In order to obtain water-soluble condensation products there are used amino compounds which, besides the basic group, contain a radical rendering the products soluble in water, such as, for instance, the sulpho- or the carboxyl-group, or the radicals rendering the products soluble in water are subsequently introduced into the condensation products.

Urethane-like compounds may also be obtained by causing chlorocarbonic acid esters of hydroxy-alkyl ethers, polyhydroxy-alkyl ethers or polyglycol ethers of aromatic or hydroaromatic hydroxyl compounds substituted by at least one hydrocarbon or acyl radical with at least 4 C-atoms, for instance of alkylphenolmonohydroxy-alkyl ethers or alkylphenolpolyhydroxyalkyl ethers and the corresponding products hydrogenated in the nucleus, to react with basic compounds containing primary or secondary nitrogen. If in the basic compounds, for instance, in an alkyl-, aryl or aralkyl radical present there is no group that lends solubility in water, such group may, if necessary, be introduced, the entrance taking place perhaps also into the nucleus.

For this manufacture for instance chlorocarbonic acid esters of the following compounds may be used: octylphenol, iso-octylphenol, dodecylphenol, iso-dodecylphenol, tributylphenol, benzylphenol, cyclohexylphenol, as well as the alcohols obtainable from these compounds by hydrogenating them in the nucleus. Amino compounds carrying primary or secondary amino groups are, for instance, dodecylamine, ethylene-diamine, ethanolamine, cyclohexyl-ethanolamine, aniline, para-butylaniline. As amino compounds containing, besides the basic group, a radical rendering the product soluble in water, there may be used for instance: amino-sulfonic acids such as taurine, methyl-taurine, sulfanilic acid or their N-alkyl derivatives, ethanol-amino-sulfo esters, furthermore, amino-carboxylic acids such as amino-acetic acid, sarcosine, anthranilic acids and the amino-carboxylic acid mixtures which may be obtained by decomposition of albuminous products.

One procedure consists in causing the chlorocarbonic acid ester to react with an aqueous solution of the reaction component containing the amino group or groups, in the presence of an alkali or alkali carbonate. The components may also be condensed in an indifferent solvent while adding a tertiary organic base.

The new urethane-like compounds correspond with the following general formula:

$$X.A.O.(R_1.O)_n.CO.N(R_2).R_3$$

wherein

X stands for a member of the group consisting of hydrocarbon radicals with at least 4 carbon atoms and acyl radicals with at least 4 carbon atoms, A for a carbocyclic hydrocarbon radical, $R_1$ for an aliphatic hydrocarbon radical, $R_2$ for a member of the group consisting of hydrogen and hydrocarbon radicals, $R_3$ for a member of the group consisting of hydrocarbon radicals, hydrocarbon radicals substituted by OH, hydrocarbon radicals substituted by COOH, hydrocarbon radicals substituted by $SO_3H$, hydrocarbon radicals substituted by $OSO_3H$, hydrocarbon radicals substituted by $NH_2$ and $n$ stands for a member of the series of whole numbers beginning with 1.

In so far as the compounds obtainable by the invention contain in the molecule groups lending solubility in water, for instance, a carboxyl group, a sulfo-group or several hydroxyl groups or other hydrophil groups, they are in themselves or in the form of their salts strongly foaming products having a dispersing action and a great wetting and washing power. The presence of a hydroxyalkyl or polyhydroxyalkyl or polyglycol radical between the aromatic or hydrogenated nucleus and the urethane bridge gives these new compounds an especially advantageous character and valuable textile-chemical properties. The aqueous solutions are distinguished by their stability towards boiling, partly also in the presence of dilute acids and lyes.

Owing to the absence of groups lending solubility in water or their high molecular weight some of the urethanes are soluble only in organic solvents or are not at all soluble; or they are soluble in water, from which, however, by appropriate treatment, they separate in a more or less dispersed state.

In so far as the new substances are soluble in water they may be used as auxiliary agents in the textile industry and as washing and cleaning agents either alone or together with other products such as soap, alcohol-sulfonates, fatty acid condensation products, alkylated benzene or naphthalene-sulfonic acids, water-soluble cellulose derivatives, alcohols or amines or phenols, especially alkyl-phenols and their hydrogenation products, which have reacted with ethylene oxide; furthermore salts such as sodium carbonate, ortho-, meta- or pyro-phosphates, with or without a substance yielding oxygen such as perborate or the like.

The following examples serve to illustrate the invention but they are not intended to limit it thereto, the parts being by weight:

(1) 108 parts of an iso-dodecylphenol-chlorocarbonic acid ester (obtainable from iso-dodecylphenol and phosgene, in the presence of dimethylaniline) and 60 parts of caustic soda solution of 40° Bé. are introduced simultaneously in the course of 3 hours into a solution of 55 parts of the sodium salt of methyltaurine in 400 parts of water, at 50° C.–60° C., while stirring. One continues stirring for one hour at the said temperature and neutralizes then by means of dilute hydrochloric acid. The product separates and is filtered with suction, after cooling. The paste thus obtained, diluted in water of 20° German hardness, forms well foaming solutions, which are very suitable for washing wool.

(2) 30 parts of sarcosine and 70 parts of calcined sodium carbonate are dissolved together in 600 parts of water. 108 parts of iso-dodecylphenol-chlorocarbonic acid ester are then caused to run gradually in the solution, at a temperature of 50° C.–60° C., while stirring. Stirring is continued for one hour at the said temperature; the paste thus obtained is evaporated to dryness. The product is a very good agent for washing white goods.

(3) 91 parts of chlorocarbonic acid ester obtainable from iso-octyl-cyclohexanol and phosgene, and 60 parts of caustic soda solution of 40° Bé. are simultaneously and gradually introduced into a solution of 55 parts of the sodium salt of methyltaurine in 400 parts of water, at a temperature of 40° C.–50° C., while stirring. The solution is then neutralized by means of dilute mineral acid and the mass obtained is evaporated to dryness.

(4) 400 parts of the chlorocarbonic acid ester of iso-octyl-phenyltriglycol ether obtained by causing phosgene to act upon the latter in benzene solution in the presence of dimethylaniline, are introduced at 20° C.–30° C. into 500 parts of a sarcosine solution of 19 per cent. strength at a constantly triazene-alkaline reaction which is maintained by gradually adding 125 parts of caustic soda solution of 35 per cent. strength. The whole is subsequently stirred for about 2 hours at 40° C.–50° C., until a test sample is soluble in water to a clear solution. The paste obtained which contains the sodium salt of the sarcoside is evaporated to dryness; the dry salt yields in water clear foaming solutions of great washing power.

(5) 356 parts of chlorocarbonic acid ester of iso-octylphenyldiglycol ether are gradually introduced, as described in Example 4 into 660 parts of a methyltaurine solution of 22 per cent. strength the alkaline reaction being maintained by addition of caustic soda solution of 35 per cent. strength. The temperature is kept between 30° C. and 50° C. and is raised during the subsequent stirring operation to 70° C.–80° C. until a test sample is soluble in water to a clear solution and is not precipitated even on acidification. The pasty mass may be worked up as described in Example 4. The methyltauride of the iso-octylphenyldiglycol ether-monocarbonic acid ester is a product which in aqueous solution has a good foaming power and cleansing action.

(6) 284 parts of the chlorocarbonic acid ester of iso-hexylphenylglycol ether are introduced at 60° C. simultaneously with 125 parts of caustic soda solution of 35 per cent. strength into the solution of 220 parts of methylglucamine in 440 parts of water and the whole is subsequently stirred for 4 hours at 80° C. The paste of the methylglucamide thus obtained is adjusted to the desired strength; when diluted with a large amount of water it is a good foaming and dispersing agent.

(7) To 100 parts of ethylenediamine there are added at room temperature 312 parts of the chlorocarbonic acid ester of iso-octylphenylmonoglycol ether, while simultaneously adding caustic soda solution for maintaining the alkaline reaction: the temperature rises and is first kept at 40° C. In order to complete the reaction, the whole is subsequently stirred for about 2 hours at 70° C.–80° C. The product which is insoluble in water may be obtained in a form free from salt by dissolving it in alcohol or benzene. By sulfonating by one of the known methods the product separated from the solvent, it is obtained in a water-soluble form and as such it may be used in a manner similar to the products of the preceding examples.

(8) 850 parts of the chlorocarbonic acid ester of iso-dodecylphenyldodecylglycol ether are caused to react with 500 parts of a sarcosine solution under the conditions indicated in Example 4. The product worked up in an analogous manner has a good washing action and is likewise stable towards calcium salts as well as in acid and alkaline solution.

(9) 312 parts of the chlorocarbonic acid ester of iso-octylphenylmonoglycol ether are caused to react at 20° C.–30° C., as indicated in Example 6, with 80 parts of amino-ethanol in the presence of an equivalent amount of concentrated caustic soda solution; at 60° C. the whole is subsequently treated for about 1 hour. By isolating the ethanol amide in a form free from salt and treating it in a dry inert solvent with the calculated amount of chlorosulfonic acid, water-soluble products may be obtained which are useful adjuvants in the textile industry.

(10) 406 parts of chlorocarbonic acid ester of iso-octylcyclohexyltriglycol ether are introduced, drop by drop, into 500 parts of a sarcosine solution of 19 per cent. strength at a triazene-alkaline reaction, while slowly adding 125 parts of caustic soda solution of 35 per cent. strength. The temperature is 20° C.–30° C. The whole is further stirred at 50° C. for about two hours; a white paste is obtained which dissolves in water, while foaming, to a clear solution.

(11) Into 500 parts of a sarcosine solution of 19 per cent. strength (19 per cent. of free acid) there are introduced at 20° C.–30° C. in the course of 2–3 hours and at a constantly triazene-alkaline reaction 470 parts of the chlorocarbonic acid ester of para-lauroylphenyltriglycol ether, while gradually adding 125 parts of caustic soda solution of 35 per cent. strength and vigorously stirring. The whole is finally heated for several hours at about 50° C.; the paste containing the sodium salt of the sarcoside is neutralized to the desired concentration or it is dried so as to form a powder. This powder dissolves in water to a clear strongly foaming solution. The solutions possess good cleansing and wetting properties.

(12) 95 parts of sodium sulfanilate and 30 parts of sodium hydroxide are dissolved in 1000 parts of water. To the solution there are then added, while stirring and in the course of 1 hour, 134 parts of iso-octylphenolchlorocarbonic acid ester, the temperature being kept between 50° C.–60° C. The whole is neutralized by means of dilute hydrochloric acid until a feebly alkaline reaction occurs and the paste obtained is evaporated to dryness.

(13) 25 parts of sodium hydroxide are added to 1100 parts of an aqueous solution of sodium cyclohexyltauride of 10 per cent. strength and at about 50° C. 165 parts of iso-dodecylcyclohexanolchlorocarbonic acid ester are gradually caused to run in, while stirring. The paste obtained is neutralized by means of dilute mineral acid and evaporated to dryness. The product has the following constitution:

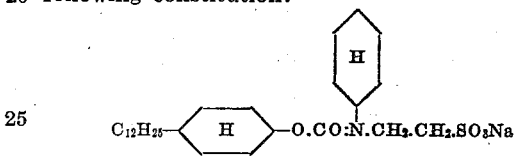

(14) 442 parts of chlorocarbonic acid ester of iso-octylphenyltripropyleneglycol ether obtained by causing phosgene to act upon the latter in benzene solution, are caused to run into 530 parts of sarcosine solution of 18 per cent strength at 20° C.–30° C., an alkaline reaction of the solution being maintained. About 130 parts of caustic soda solution of 32 per cent. strength are then added in an even course. After about 3 hours' stirring at 40° C.–60° C. a test sample dissolves in water to a clear solution. The paste of the sarcoside-sodium salt may be evaporated to form a dry powder and is a very good washing agent of great foaming power.

(15) 624 parts of the chlorocarbonic acid ester obtainable by causing tetradecylnaphthyl-pentaglycolether in xylene solution to react with phosgene are gradually introduced into 650 parts of aqueous methyl taurine solution of 25 per cent. strength simultaneously with about 150 parts of caustic soda solution of 32 per cent. strength and the whole is stirred for several hours at 50° C.–80° C. until a test sample is sufficiently soluble in water and, on acidification, remains clear. The paste of the methyltauride may be used as such as washing and cleansing agent or may be transformed into the salt-form.

(16) 312 parts of chlorocarbonic acid ester of iso-octylphenylmonoglycolether are gradually added at 40° C.–50° C. to a mixture of 185 parts of dodecylamine and 100 parts of pyridine and the whole is stirred for 3 hours at 60° C.–70° C. The reaction mass is poured into a large quantity of water and the whole is stirred vigorously for some time. If required, this operation may be repeated until the dodecylamide of the iso-octylphenylmonoglycolformic acid is free from pyridine. By drying under reduced pressure any traces of water are finally removed from the molten amide.

(17) 400 parts of chlorocarbonic acid ester of iso-octylphenyltriglycolether are gradually mixed, as described in the preceding example, with 145 parts of cyclohexyletanolamine in the presence of 90 parts of pyridine at 30° C.–50° C. and the whole is after-treated for a short time at 50° C.–70° C. After separation of the pyridine hydrochloride there is obtained with a good yield, by washing out in water, the cyclohexylethanolamide of iso-octyl-phenyltriglycolether formic acid as a sirupy mass.

(18) 233 parts of chlorocarbonic acid ester of para-oxydiphenyl

are introduced in the course of one hour, while stirring, into a solution of 175 parts of sodium ethanolamino sulfonate and 50 parts of caustic soda in 2000 parts of water at about 50° C. The whole is stirred for further 2 hours at 50° C., neutralized by means of dilute sulfuric acid and evaporated under reduced pressure to a contents of 25 per cent of the sodium salt formed:

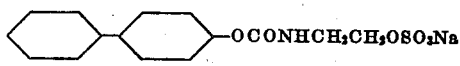

(19) 284 parts of chlorocarbonic acid ester of cyclohexylphenyl-monoglycolether of the formula

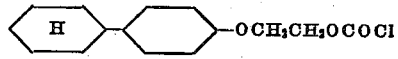

are introduced at 40° C.–45° C., while stirring well, into a solution of 170 parts of methyltaurine-sodium salt in 2000 parts of water, the alkaline reaction being maintained by addition of caustic soda solution. The whole is further stirred for 2–3 hours and neutralized by means of dilute sulfuric acid.

After evaporation under reduced pressure the sodium salt of the formula:

is obtained as a sirupy mass.

We claim:

1. The urethane-like compound of the formula:

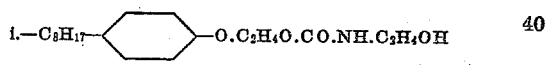

2. The urethane-like compound of the formula:

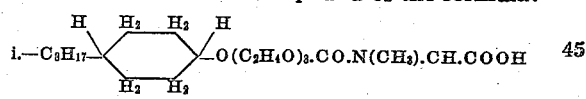

3. Urethane-like compounds of the general formula:

$$X.A.O(R_1.O)_n.CO.N(R_2).R_3$$

wherein
X stands for a member of the group consisting of aliphatic hydrocarbon radicals, cycloaliphatic hydrocarbon radicals, aromatic hydrocarbon radicals, carboxylic acyl radicals, said radicals containing at least 4 carbon atoms,
A stands for a carbocyclic hydrocarbon radical,
$R_1$ stands for a lower alkylene radical,
$R_2$ stands for a member of the group consisting of hydrogen, alkyl and cycloalkyl radicals,
$R_3$ stands for a member of the group consisting of alkyl substituted by several OH groups, by $SO_3H$, by $OSO_3H$, by COOH and aryl substituted by $SO_3H$, by COOH,
$n$ stands for a member of the series of whole numbers beginning with 1.

4. Urethane-like compounds of the general formula:

$$X.A.O(R_1.O)_n.CO.N(R_2).R_3$$

wherein
X stands for an alkyl radical containing at least 4 carbon atoms,
A stands for a six-membered carbocyclic hydrocarbon radical,
$R_1$ stands for a lower alkylene radical, $R_2$ stands for a member of the group consisting of hydrogen, alkyl and cycloalkyl radicals,
$R_3$ stands for a member of the group consisting of alkyl substituted by several OH groups, by $SO_3H$, by $OSO_3H$, by COOH and aryl substituted by $SO_3H$, by COOH, $n$ stands for a member of the series of whole numbers beginning with 1.

ADOLF STEINDORFF.
GERHARD BALLE.
KARL HORST.
JOHANN ROSENBACH.